United States Patent
Lim et al.

(10) Patent No.: US 9,890,282 B2
(45) Date of Patent: Feb. 13, 2018

(54) FLAME RETARDANT THERMOPLASTIC RESIN COMPOSITION AND ELECTRIC WIRE COMPRISING THE SAME

(71) Applicant: LG CHEM, LTD., Seoul (KR)

(72) Inventors: Sung Hwan Lim, Daejeon (KR); Soo Min Lee, Daejeon (KR); Jong Kuk Choi, Daejeon (KR); Sung Ho Lee, Daejeon (KR); Eung Soo Kim, Daejeon (KR); Sang Ho Lee, Daejeon (KR); Nam Jib Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 111 days.

(21) Appl. No.: 14/769,419

(22) PCT Filed: Feb. 25, 2015

(86) PCT No.: PCT/KR2015/001845
§ 371 (c)(1),
(2) Date: Aug. 20, 2015

(87) PCT Pub. No.: WO2015/130089
PCT Pub. Date: Sep. 3, 2015

(65) Prior Publication Data
US 2016/0251514 A1  Sep. 1, 2016

(30) Foreign Application Priority Data

Feb. 28, 2014  (KR) .................. 10-2014-0024492
Feb. 25, 2015  (KR) .................. 10-2015-0026758

(51) Int. Cl.
C08L 71/12 (2006.01)
C08L 23/10 (2006.01)
C08L 25/04 (2006.01)
C08K 5/49 (2006.01)
H01B 7/295 (2006.01)

(52) U.S. Cl.
CPC ............... C08L 71/12 (2013.01); C08K 5/49 (2013.01); C08L 23/10 (2013.01); C08L 25/04 (2013.01); H01B 7/295 (2013.01); C08L 2201/02 (2013.01); C08L 2201/08 (2013.01); C08L 2203/202 (2013.01); C08L 2205/03 (2013.01); C08L 2207/04 (2013.01)

(58) Field of Classification Search
CPC .......... C08L 71/12; C08L 23/10; C08L 25/04; C08K 5/49; H01B 7/295
See application file for complete search history.

(56) References Cited

U.S. PATENT DOCUMENTS

| | | | |
|---|---|---|---|
| 5,714,550 A * | 2/1998 | Shaw | C08K 3/38 524/188 |
| 2002/0156182 A1 | 10/2002 | Adedeji et al. | |
| 2005/0075426 A1* | 4/2005 | Campbell | C08F 283/08 524/115 |
| 2007/0261878 A1 | 11/2007 | Kosaka et al. | |

FOREIGN PATENT DOCUMENTS

| | | |
|---|---|---|
| CN | 1217993 C | 9/2005 |
| CN | 1711317 A | 12/2005 |
| JP | 03-062849 A | 3/1991 |
| JP | 3-109464 A | 5/1991 |
| JP | 2004-517999 A | 6/2004 |
| JP | 2010-138215 A | 6/2010 |
| KR | 1020100017356 A | 2/2010 |
| KR | 101036871 B1 | 5/2011 |
| KR | 10-2012-0023109 A | 3/2012 |
| KR | 1020130057961 A | 6/2013 |
| KR | 1020130078435 A | 7/2013 |
| KR | 1020130079535 A | 7/2013 |
| KR | 1020130121152 A | 11/2013 |
| WO | 02057364 A2 | 7/2002 |
| WO | 2004046246 A1 | 6/2004 |
| WO | 2013/013366 A1 | 1/2013 |

\* cited by examiner

*Primary Examiner* — Bijan Ahvazi
*Assistant Examiner* — Thuy-Ai N Nguyen
(74) *Attorney, Agent, or Firm* — Dentons US LLP

(57) ABSTRACT

Disclosed are a flame retardant thermoplastic resin composition suitable for preparing an electric wire, etc. by enhancing extrudability of a resin composition without hindering flame retardancy of the resin composition, and an electric wire comprising the same. The flame retardant thermoplastic resin composition comprises a matrix resin that comprises 20% to 40% by weight of a poly arylene ether resin, 20% to 40% by weight of a vinyl aromatic resin and 5% to 17% by weight of a polypropylene resin comprising a rubber ingredient, and 10% to 30% by weight of a flame retardant, based on a total weight of the resin composition.

20 Claims, No Drawings

FLAME RETARDANT THERMOPLASTIC RESIN COMPOSITION AND ELECTRIC WIRE COMPRISING THE SAME

This application is a National Stage Application of International Application No. PCT/KR2015/001845, filed Feb. 25, 2015, and claims the benefit of Korean Application No. 10-2014-0024492, filed Feb. 28, 2014, and Korean Application No. 10-2015-0026758, filed Feb. 25, 2015, all of which are hereby incorporated by reference in their entirety for all purposes as if fully set forth herein.

TECHNICAL FIELD

The present invention relates to a flame retardant thermoplastic resin composition and an electric wire comprising the same. More particularly, the present invention relates to a flame retardant thermoplastic resin composition suitable for preparing an electric wire, etc. by enhancing extrudability of a resin composition without hindering flame retardancy of the resin composition, and an electric wire comprising the same.

BACKGROUND ART

Attempts to substitute polyvinyl chloride (PVC) with other materials are actively underway in a variety of industries. However, development of proper substitutes is limited due to flame retardancy, etc. as advantages of polyvinyl chloride. In particular, in preparing electric wires such as cables, it is not easy to realize flame retardancy of polyvinyl chloride using a substitute for polyvinyl chloride.

Regulations regarding flame retardancy are based on UL (Underwriters Laboratories) standards, and, in preparing a resin composition, particularly a thermoplastic resin composition, having suitable flame retardancy satisfying UL standards, a halogen-based flame retardant and a flame retardant are generally kneaded in a thermoplastic resin. Polybromodiphenylether, tetrabromobisphenol A, an epoxy compound with a bromine substituent, chlorinated polyethylene, etc. were mainly used as the halogen-based flame retardant. As the flame retardant, antimony-based compounds are used and, thereamong, antimony trioxide and antimony pentoxide are generally used.

As described above, when flame retardancy is provide to a thermoplastic resin by applying a halogen-based flame retardant and antimony-based flame retardant together, excellent flame retardancy is exhibited and a thermoplastic resin composition, which may produce final products nearly without property deterioration, may be prepared. However, upon processing, hydrogen halide gas is generated and thus a mold may be damaged. In addition, upon discarding, dioxin having strong carcinogenicity is discharged from a waste incinerator due to the presence of a halogen compound, thus harmfully affecting the environment and the human body. Furthermore, regulations on use of halogen-based flame retardant resin materials are actively applied in Europe, and thus, development of materials of a flame retardant thermoplastic resin composition not comprising halogen is required.

In order to provide flame retardancy to a thermoplastic resin composition not comprising halogen, aromatic phosphorus-based ester compounds are generally used. When such a phosphorus-based ester compound is applied alone, heat resistance of a thermoplastic resin is decreased and it is difficult to accomplish desired flame retardancy. Accordingly, in order to enhance heat resistance of a thermoplastic resin and provide flame retardancy thereto, a method of applying a phosphoric ester compound blended with polyphenylene ether has been suggested and studied.

In an embodiment, Korean Patent unexamined Publication No. 10-2013-0121152 discloses a polyphenyl ether elastomer composition. The polyphenyl ether elastomer composition comprises 10 to 46 parts by weight of polyphenylether, 3 to 5 parts by weight of polystyrene, 3 to parts by weight of polystyrene having superior impact resistance, 6 to 13 parts by weight of polyolefin elastomer, 13 to 23 parts by weight of a hydrogenated styrene-butadiene block copolymer, 6 to 16 parts by weight of low-density polyethylene, 5 to 8 parts by weight of a low-density polyethylene graft polystyrene copolymer and 18 to 20 parts by weight of a phosphate flame retardant. In addition, Korean Patent unexamined Publication No. 10-2010-0017356 discloses a flame retardant thermoplastic composition and a product comprising the same. The flame retardant thermoplastic composition comprises poly(arylene ether), block copolymer, liquid polyolefin and a flame retardant additive. The flame retardant additive composition comprises phosphate selected from the group consisting of metal hydroxide, organic phosphate and melamine phosphate, melamine pyrophosphate, melamine orthophosphate, melem polyphosphate, melam polyphosphate, diammonium phosphate, monoammonium phosphate, amide phosphate, melamine polyphosphate, ammonium polyphosphate, amide phosphate and a combination of two or more thereof.

Poly arylene ether comprising the polyphenylene ether is an amorphous resin and has advantages such as superior flame retardancy, insulating properties, heat resistance, rigidity, etc. poly arylene ether modified from the poly arylene ether has substantial advantages in regard to flame retardancy. However, since poly arylene ether has high processing temperature, flame retardant types which may be used are greatly limited. In addition, when a flame retardant is added, in an amount greater than a certain range, to a thermoplastic resin composition comprising the polyphenylarylene ether, there are problems in dispersion of a flame retardant upon processing to electric wires such as cables, and a flame retardant is protruded to a surface of a product that is processed and molded, thereby deteriorating appearance and quality of the product. Accordingly, the total amount of a flame retardant added is limited. In particular, upon extrusion, various problems related to appearance are more likely to occur.

Although various olefin materials are used, it is still difficult to overcome the limitations described above. When general polypropylene and polyethylene based materials are used, various properties in regard to cable extrusion can be satisfied, but hardness increases and cable flexibility is negatively affected.

Therefore, there is still a need for development of a flame retardant thermoplastic resin composition that is suitable for preparation of an electric wire, etc. by addressing conventional problems and enhancing extrudability of a resin composition without decreasing flame retardancy of the resin composition.

DISCLOSURE

Technical Problem

Therefore, the present invention has been made in view of the above problems, and it is one object of the present invention to provide a flame retardant thermoplastic resin composition that may increase flexibility and realize superior flame retardancy, upon preparing electric wire, such as particularly cables, by using a poly arylene ether resin, which comprises a polypropylene resin comprising a rubber ingredient, for securing flame retardancy.

It is another object of the present invention to provide a flame retardant thermoplastic resin composition suitable for preparing an electric wire, etc. by enhancing extrudability of a resin composition without hindering flame retardancy of the resin composition.

It is yet another object of the present invention to provide a flame retardant article, particularly an electric wire such as a cable, comprising the flame retardant thermoplastic resin composition.

Technical Solution

In accordance with one aspect of the present invention, provided is a flame retardant thermoplastic resin composition comprising a matrix resin that comprises 20% to 40% by weight of a poly arylene ether resin, 20% to 40% by weight of a vinyl aromatic resin and 5% to 17% by weight of a polypropylene resin comprising a rubber ingredient, and 10% to 30% by weight of a flame retardant, based on a total weight of the resin composition.

In an embodiment, the polypropylene resin comprising the rubber ingredient may have a melt index of 10 to 50 g/10 min or 20 to 40 g/10 min. Within this range, superior extrudability, cable surface, cable extrusion characteristics, etc. are exhibited upon application of the flame retardant.

In an embodiment, the polypropylene resin comprising the rubber ingredient may comprise 1% to 20% by weight or 5% to 15% by weight of the rubber ingredient based on the total weight of the polypropylene resin comprising the rubber ingredient. Within this range, upon application of the flame retardant, superior extrudability, cable surface characteristics, and cable extrusion characteristics are exhibited.

In the polypropylene resin comprising the rubber ingredient, the rubber ingredient may be ethylene-butene rubber.

The flame retardant may be selected from the group consisting of nitrogen-based flame retardants, phosphorus-based flame retardants and mixtures thereof.

Advantageous Effects

As apparent from the foregoing, the present invention advantageously provides a flame retardant thermoplastic resin composition suitable for preparing an electric wire, etc. by enhancing extrudability of a resin composition without hindering flame retardancy of the resin composition, and an electric wire comprising the same.

BEST MODE

Hereinafter, the present invention is described in more detail.

A flame retardant thermoplastic resin composition according to the present invention comprises a matrix resin that comprises 20% to 40% by weight of a poly arylene ether resin, 20% to 40% by weight of a vinyl aromatic resin and 5% to 17% by weight of a polypropylene resin comprising a rubber ingredient, and 10% to 30% by weight of a flame retardant, based on a total weight of the resin composition.

The poly arylene ether resin provides heat resistance and flame retardancy to the resin composition according to the present invention and is a homopolymer of a compound represented by Formula 1 below or a copolymer comprising a compound of Formula 1 below.

[Formula 1]

wherein $R_1$, $R_2$, $R_3$ and $R_4$ are a substituent of aryl (Ar), and each independently or simultaneously chlorine, bromine, iodine, methyl, ethyl, propyl, allyl, phenyl, methylbenzyl, chloromethyl, bromomethyl, cyanoethyl, cyano, methoxy, phenoxy or a nitro group, and Ar is C6 to C20 aryl. Particularly, in Formula 1, $R_1$ and $R_2$ are alkyl, particularly a C1 to C4 alkyl polymer, and a polymerization degree is preferably 50 or more. As a homopolymer of the poly arylene ether resin, poly(2,6-dimethyl-1,4-phenylene)ether, poly(2,6-diethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether or poly(2,6-diphenyl-1,4-phenylene)ether, or poly(2,5-dimethyl-1,4-phenylene)ether may be used. However, the compounds are merely listed for illustrative purposes and it is not intended to limit the present invention thereto. In addition, a copolymer of 2,6-dimethylphenol and 2,3,6-trimethylphenol, or a polyphenylene ether copolymer having a polyphenylene ether structure as a main chain such as a copolymer of 2,6-dimethylphenol and o-cresol or a copolymer of 2,3,6-trimethylphenol and o-cresol may be used as a copolymer of the poly arylene ether resin. However, the compounds are merely listed for illustrative purposes and it is not intended to limit the present invention thereto. In particular, poly(2,6-dimethyl-1,4-phenylene)ether having an intrinsic viscosity of 0.25 to 0.50 dl/g (measured under conditions of 0.5 g/dl, chloroform solution and 30° C.) is preferably used as the polyphenylene ether-based resin. As the polyphenylene ether resin, a modified polyphenylene ether resin obtained by reacting α,β-unsaturated carboxylic acid or derivatives thereof, styrene or derivatives thereof, or unsaturated carboxylic acid or derivatives thereof with the homopolymer or the copolymer of the polyphenylene ether to a melted state, a solution state or a slurry state at 30 to 350° C. in the presence or absence of an initiator, other than the homopolymer and the copolymer of the polyphenylene ether, may be used.

As the poly arylene ether resin, a polyphenylene ether resin represented by Formula 2 below may be preferably used.

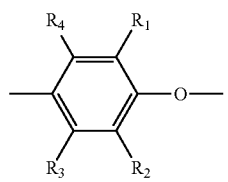
[Formula 2]

wherein $R_1$, $R_2$, $R_3$ and $R_4$ are each independently or simultaneously chlorine, bromine, iodine, methyl, ethyl, propyl, allyl, phenyl, methylbenzyl, chloromethyl, bromomethyl, cyanoethyl, cyano, methoxy, phenoxy or a nitro group. Particularly, in Formula 2, $R_1$ and $R_2$ are alkyl, particularly a C1 to C4 alkyl polymer, and a polymerization degree is preferably 50 or more. As a homopolymer of the poly (phenylene ether) resin, poly(2,6-dimethyl-1,4-phenylene) ether, poly(2,6-diethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene) ether, poly(2,6-dimethoxy-1,4-phenylene)ether, poly(2,6-dichloromethyl-1,4-phenylene)ether, poly(2,6-dibromomethyl-1,4-phethylene)ether or poly(2,6-diphenyl- 1,4-phenylene)ether, or poly(2,5-dimethyl-1,4-phenylene) ether may be used. In addition, a copolymer of 2,6-dimethylphenol and 2,3,6-trimethylphenol, or a polyphenylene ether copolymer having a polyphenylene ether structure as a main chain such as a copolymer of 2,6-dimethylphenol and o-cresol or a copolymer of 2,3,6-trimethylphenol and o-cresol may be used as a copolymer of the poly(phenylene ether) resin. In particular, poly(2,6-dimethyl-1,4-phenylene) ether having an intrinsic viscosity of 0.25 to 0.50 dl/g (measured under conditions of 0.5 g/dl, chloroform solution and 30° C.) is preferably used as the polyphenylene ether-based resin. As the polyphenylene ether resin, a modified polyphenylene ether resin obtained by reacting $\alpha,\beta$-unsaturated carboxylic acid or derivatives thereof, styrene or derivatives thereof, or unsaturated carboxylic acid or derivatives thereof with the homopolymer or the copolymer of the polyphenylene ether to a melted state, a solution state or a slurry state at 30 to 350° C. in the presence or absence of an initiator, other than the homopolymer and the copolymer of the polyphenylene ether, may be used.

The polyphenylene ether resin is used in an amount of 20% to 40% by weight, preferably 25% to 33% by weight, more preferably 27% to 31% by weight based on the total amount of the resin composition according to the present invention. In this case, flame retardancy and heat resistance may be advantageously provided to the resin composition according to the present invention.

The vinyl aromatic resin may be a homopolymer of a vinyl aromatic monomer selected from the group consisting of a vinyl aromatic monomer, preferably styrene, $\alpha$-methylstyrene, p-methylstyrene, vinyltoluene, t-butylstyrene and mixtures of two or more thereof, or a vinyl-based monomer copolymerizable with the vinyl aromatic monomer, preferably olefins such as vinyl acetate, acrylates, methacrylates, ethylene or propylene, unsaturated fatty acids such as acrylic acid, methacrylic acid, itaconic acid or maleic acid, anhydrides of the fatty acids, or those broadly used in copolymerization of vinyl chloride. In particular, examples of a comonomer having an unsaturated double-bond includes ethylacrylate, ethylmethacrylate, n-propyl acrylate, n-propyl methacrylate, isopropylacrylate, isopropyl methacrylate, sec-butylacrylate, sec-butyl ethacrylate, isobutylacrylate, isobutyl ethacrylate, 2-ethylhexylacrylate, 2-ethylhexylmethacrylate, laurylacrylate, laurylmethacrylate, stearylacrylate and stearylmethacrylate. Examples of a comonomer containing an epoxy group include glycidylacrylate and glycidylmethacrylate, examples of a comonomer containing a carboxyl group include acrylic acid, methacrylic acid, itaconic acid, fumaric acid and maleic acid, and examples of a comonomers containing a hydroxyl group include 2-hydroxyethylacrylate, 2-hydroxyethylmethacrylate, 2-hydroxypropylacrylate, 2-hydroxypropyl methacrylate, 2-hydroxybutylacrylate and 2-hydroxybutyl ethacrylate. However, the comonomers may be copolymers with vinyl-based monomers not described above. The vinyl aromatic resin may be preferably a styrene-based polymer and a styrene-based copolymer, more preferably an SEBS-based block copolymer. The SEBS-based block copolymer is prepared by block-copolymerizing styrene, ethylene and butylene as monomers and is preferably a linear polymer. Here, a weight ratio of styrene/rubber ingredient is 10 to 50/50 to 90. Here, the rubber ingredient means a portion composed of ethylene and butylene. Such an SEBS-based block copolymer may have a Shore A hardness of 45 to 70. The hardness may proportionally increase according to increase of the content of the vinyl aromatic monomer. For example, an SEBS-based block copolymer (SBC 1) including 13% by weight of styrene (styrene/rubber ingredient=13/87) may have a Shore A hardness of 47 and an SEBS-based block copolymer (SBC 2) including 42% by weight of styrene (styrene/rubber ingredient=42/58) may have a Shore A hardness of 65, but the present invention is not limited thereto. When the vinyl aromatic resin is used in an amount of 20% to 40% by weight, preferably 27% to 36% by weight, more preferably 29% to 34% by weight based on the total amount of the resin composition according to the present invention, a molded product obtained using the resin composition may exhibit increased flexibility, properties of a resin composition are stabilized by increasing compatibility between the poly arylene ether resin and the olefin-based resin, and flame retardancy may be effectively enhanced having market competitiveness.

The polypropylene resin comprising the rubber ingredient contains a rubber ingredient in a main chain of the polypropylene resin. Hardness of the polypropylene resin comprising such a rubber ingredient is decreased due to the rubber ingredient in a main chain, and productivity of an electric wire, particularly a cable, prepared using the resin composition obtained according to the present invention by increasing melt index increases.

In an embodiment, the melt index of the polypropylene resin comprising the rubber ingredient may be preferably 10 to 50 g/10 min, 15 to 45 g/10 min or 20 to 40 g/10 min. Within this range, superior extrudability and cable surface characteristics are exhibited. Here, the melt index (MI) is measured under a condition of 230° C. and 2.16 kg according to ASTM D1238. When the polypropylene resin comprising the rubber ingredient comprises 1% to 20% by weight, preferably 5% to 12% by weight, more preferably 6% to 9% by weight of the rubber ingredient based on the total weight of the polypropylene resin comprising the rubber ingredient, hardness of the polypropylene resin comprising the rubber ingredient is properly maintained and the melt index of the resin composition according to the present invention comprising the same is increased, whereby productivity of an electric wire, particularly a cable, prepared using the resin composition obtained according to the present invention is effectively enhanced.

The rubber ingredient in the polypropylene resin comprising the rubber ingredient may be at least one selected from the group consisting of ethylene-butene rubber, ethylene-propylene rubber and ethylene-propylene-diene (EPDM) rubber. Here, when a weight ratio of ethylene: butene is 1 to 9:9 to 1, the melt index of the resin composition according to the present invention comprising the rubber ingredient is increased while properly maintaining hardness of the polypropylene resin comprising the rubber ingredient, whereby productivity of an electric wire, particularly a cable, prepared using the resin composition obtained according to the present invention is effectively enhanced.

The polypropylene resin comprising the rubber ingredient is a reactive polypropylene resin (reactor-made thermoplastic polypropylene, when polyolefin is polypropylene in RTPO), and provides a flame-retardant and insulative resin composition satisfying predetermined standards regarding wear resistance, flexibility and elasticity. In an embodiment, the polypropylene resin comprising the rubber ingredient means a polymer, which exhibits rubber characteristics, prepared by polymerizing a rubber ingredient and a propylene monomer. Reactive polypropylene used in an insulative resin composition of the present invention should satisfy predetermined standards regarding wear resistance, flexibility and elasticity. When the polypropylene resin comprising the rubber ingredient is used in an amount of 5% to 17% by weight, preferably 10% to 16% by weight, more preferably 11% to 15% by weight, based on the total amount of the resin composition according to the present invention, the contents of other expensive resins constituting the resin composition are lowered and thus economic efficiency increases. In addition, by increasing a melt index of the resin composition comprising the rubber ingredient, productivity of a molded product prepared using the resin composition is increased, flexibility of a molded product obtained is increased, and compatibility between the poly arylene ether resin and the vinyl aromatic resin in the resin composition is effectively increased.

The resin composition according to the present invention comprise a matrix resin that comprise the poly arylene ether resin, the vinyl aromatic resin and the polypropylene resin comprising the rubber ingredient described above. The matrix resin constitutes sheaths of electric wires including cables. In particular, the present invention further comprises flame retardants for further providing flame retardancy to the resin of the matrix.

The flame retardant may be a general flame retardant for providing flame retardancy to synthetic resins or resin compositions. When the flame retardant is used in an amount of 10% to 30% by weight based on the total amount of the resin composition according to the present invention, the resin composition according to the present invention may be provided with superior flame retardancy.

The flame retardant may preferably comprise a nitrogen-based flame retardant. The nitrogen-based flame retardant may effectively provide superior flame retardancy to the resin composition obtained according to the present invention. Examples of the nitrogen-based flame retardant include melamine or melamine derivatives. Specific examples of the nitrogen-based flame retardant include melamine, melamine cyanurate, melem-phosphate reaction products or mixtures thereof, namely, melamine phosphate, melamine pyrophosphate, melamine polyphosphate, etc., but the present invention is not limited thereto. When the nitrogen-based flame retardant is used in an amount of 7% to 15% by weight, preferably 9% to 14% by weight, more preferably 10 to 13% by weight based on the total amount of the resin composition according to the present invention, superior flame retardancy may be effectively provided while satisfactorily maintaining tensile strength and elongation.

The flame retardant may comprise a phosphorus-based flame retardant. The phosphorus-based flame retardant may be a general flame retardant used to provide flame retardancy to a synthetic resin or a resin composition. Preferably, a halogen-based flame retardant is not used to provide eco-friendly flame retardancy, and other phosphorus-based flame retardant except for red phosphorus among phosphorus-based flame retardants may be used. The phosphorus-based flame retardant may be a powder, particularly may be selected from the group consisting of, for example, phosphate ester compound, phosphate, pyrophosphate, phosphonate, metal-substituted phosphinate, phosphanate, metal phosphate and mixtures of two or more thereof. Preferably, the phosphate ester compound is a monomer having an aromatic group and is selected from the group consisting of particularly trimethylphosphate, triethylphosphate, tributylphosphate, trioctylphosphate, triphenylphosphate, tricresylphosphate, trixylenylphosphate, cresyldiphenylphosphate, octyldiphenylphosphate and aromatic diphosphate having a structure of Formula 3 below.

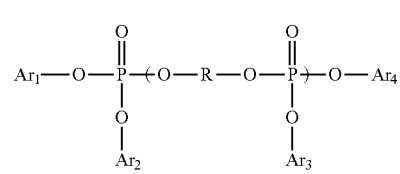

[Formula 3]

wherein $Ar_1$, $Ar_2$, $Ar_3$ and $Ar_4$ are the same or different, each of which is phenyl or aryl substituted with one to three C1 to C4 alkyl, R is phenyl or bisphenol-A, and n is 1 to 5. When the phosphorus-based flame retardant is used in an amount of 1% to 5% by weight, preferably 2% to 4% by weight, more preferably 2.3% to 3.5% by weight based on the total amount of the resin composition according to the present invention, superior flame retardancy and heat resistance are effectively provided.

In an embodiment, the metal phosphate may be aluminum phosphate, preferably aluminum dialkylphosphate.

In addition, the flame retardant thermoplastic resin composition according to the present invention may further comprise additives such as a lubricant, a thermostabilizer, an antioxidant, a light stabilizer, an anti-dripping agent, a pigment and an organic filler generally used in a resin composition within a range within which properties such as flame retardancy of the obtained resin composition are not greatly affected.

In addition, examples of a kneading apparatus which may be used in the present invention include a Banbury mixer, a single-screw extruder, a twin-screw extruder, a Buss kneader, etc. A continuous kneading apparatus is more preferable than a batch-type kneading apparatus. In particular, ingredients of the resin composition are melted/kneaded at 200 to 290° C. and extrusion-processed, as needed, dried, preferably 70 to 90° C. for two to eight hours. Subsequently, the resin composition may be used to prepare a molded product through processing such as vacuum molding, low-pressure molding, hollow molding, extrusion coating, foam extrusion, etc., preferably extrusion-molding under strong shearing stress at 230 to 260° C. using extrusion equipment. In particular, the molded product may be used in preparing electric wires comprising cables.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Examples 1 to 3 and Comparative Examples 1 to 4

Mixing was carried out according to ingredients and contents summarized in Table 1 below. Subsequently, a twin-screw extruder was set to 240 to 250° C. (temperature of feeder, to which materials are input, was set to 240° C. and the other parts were set to 250° C.), and extruded by melting/kneading. Finally, drying was performed at 80° C. for four hours after pelletizing, and then the dried pellet was stood at room-temperature for one day. Subsequently, using a 19 Φ HAAKE extruder (screw aspect ratio (L/D)=approximately 35, screw compression ratio (CR)=approximately 2.2:1) manufactured by Thermo Scientific (Germany) as a wire coating extruder, a cable was extruded (extrusion conditions: temperature was set to 240 to 250° C. (a feeder (to which materials are input) was set to 240° C., the other devices was set to 250° C.), and speed was set to 80 rpm, 30 m/min) was performed. Properties of produced specimens were evaluated and results are summarized in Table 1 below.

Property evaluation was carried out as follows:

Cable appearance evaluation: Evaluated with the naked eye according to a method described in UL 1581

Tensile strength and elongation: Measured according to a method described in UL 1581

Flame retardancy (VW-1): Measured according to a method described in UL 1581

Hardness (Shore A): Measured according to a method described in ASTM D 2240

Melt index (MI; g/10 min): Measured according to ASTM D1238 under a condition of 230° C. and 2.16 kg In addition, abbreviations used as titles of ingredients in Table 1 below are as follows:

PPE: polyphenylene ether; PX-100F manufactured by Mitsubishi Engineering Plastic (MEP), Japan SBC 1: styrene block copolymer; SEBS G 1657 (styrene content: 13%) manufactured by Kraton, USA SBC 2: styrene block copolymer; SEBS A 1536 (styrene content: 42%) manufactured by Kraton, USA PP 1: EC5082 (ethylene-butene rubber (EBR) content: 7%, melt index: 23 g/10 min), as polypropylene including rubber ingredient, manufactured by PolyMirae, Republic of Korea PP 2: polypropylene; M1400 (melt index: 8 g/10 min), as a block copolymer polypropylene resin, manufactured by DAESAN, Republic of Korea PP 3: polypropylene; EP332C (melt index: 0.35 g/10 min), as a block copolymer polypropylene resin, manufactured by PolyMirae, Republic of Korea PP 4: polypropylene; M910 (melt index: 0.6 g/10 min) as random copolymer polypropylene, manufactured by GS Caltex, Republic of Korea FR1: OP 1230 (phosphorus content: 23% to 24%) as metal phosphate, aluminum diethylphosphate, used as a phosphorus-based flame retardant, manufactured by Clariant, Japan FR2: NONFLA 601 (nitrogen content: 39% to 42%, phosphorus content: 14% to 17%) as melamine polyphosphate used as nitrogen-based flame retardant), manufactured by DOOBON, Republic of Korea FR3: (Adeka) FP-600 as bisphenol-A-diphenylphosphate (BPADP), a liquid phosphorus-based flame retardant that is liquid at room temperature, manufactured by ADEKA, Japan

TABLE 1

| Classification | Examples | | | Comparative Examples | | | | |
|---|---|---|---|---|---|---|---|---|
| Classification | 1 | 2 | 3 | 1 | 2 | 3 | 4 | 5 |
| PPE | 28 | 28 | 28 | 28 | 28 | 28 | 28 | 28 |
| SBC 1 | 11.7 | 11.7 | 11.7 | 11.7 | 11.7 | 11.7 | 11.7 | 11.7 |
| SBC 2 | 19.7 | 19.7 | 19.7 | 19.7 | 19.7 | 19.7 | 19.7 | 19.7 |
| PP 1 | 6 | 12 | 14 | 18 | | | | 1 |
| PP 2 | | | | | 12 | | | |
| PP 3 | | | | | | 12 | | |
| PP 4 | | | | | | | 12 | |
| FR 1 | 3.4 | 3.4 | 3.4 | 3.4 | 3.4 | 3.4 | 3.4 | 3.4 |
| FR 2 | 12.6 | 12.6 | 12.6 | 12.6 | 12.6 | 12.6 | 12.6 | 12.6 |
| FR 3 | 5.0 | 5.0 | 5.0 | 5.0 | 5.0 | 5.0 | 5.0 | 5.0 |
| Additive | 13.6 | 7.6 | 5.6 | 1.6 | 7.6 | 7.6 | 7.6 | 18.6 |

TABLE 1-continued

| Classification | Examples | | | Comparative Examples | | | | |
|---|---|---|---|---|---|---|---|---|
| Classification | 1 | 2 | 3 | 1 | 2 | 3 | 4 | 5 |
| Cable extrusion characteristics | | | | | | | | |
| Extrudability | ○ | ◎ | ◎ | ○ | Δ | X | X | Δ |
| Cable surface | ◎ | ◎ | ◎ | ○ | Δ | Δ | Δ | ◎ |
| Torque upon extrusion (N·m) | 31 | 32 | 34 | 38 | 30 | 36 | 35 | 41 |
| Pressure upon extrusion (bar) | 41 | 42 | 45 | 52 | 33 | 42 | 41 | 51 |
| Mechanical characteristics of cable specimens | | | | | | | | |
| melt index (250° C./10 kg) | 38.7 | 48.1 | 52.4 | 61.8 | 41.1 | 27.5 | 27.1 | 28.7 |
| Tensile strength (room-temperature T/S) | 242 | 239 | 244 | 257 | 254 | 242 | 250 | 211 |
| Elongation (room-temperature T/E) | 227 | 231 | 218 | 187 | 228 | 203 | 202 | 185 |
| Hardness | 84 | 86 | 89 | 93 | 89 | 90 | 90 | 85 |
| Flame retardancy | Pass | Pass | Pass | Fail | Pass | Fail | Fail | Pass |

Extrudability and cable surface: Classified into four steps (◎, ○, Δ, X) based on appearance quality and productivity upon cable extrusion.
Properties except for melt index and hardness were measured using cable specimens based on a UL 1581.
The additive comprises oil mineral (kixx LP600 manufactured by GS Caltex, Republic of Korea), an antioxidant (A/O), a lubricant, etc.

As shown in Table 1, it can be confirmed that the resin compositions (Examples 1 to 3) that comprise the polypropylene resin comprising the rubber ingredient according to the present invention have a proper melt index and superior flame retardancy. In addition, it can be confirmed that other mechanical properties such as tensile strength and elongation are superior, and thus, the resin compositions may be particularly useful in preparation of electric wires including cables requiring simultaneously both of processability and flame retardancy. On the other hand, it can be confirmed that, in Comparative Example 1 that comprises, in a too large amount, the polypropylene resin comprising the rubber ingredient, extrudability is somewhat satisfactory, but torque and pressure is higher upon extrusion, tensile strength is increased and elongation and flame retardancy are decreased, when compared to the examples according to the present invention. In addition, it can be confirmed that, when the polypropylene resin comprising the rubber ingredient is not comprised and general polypropylene is used, melt index is increased, whereby extrudability is dramatically decreased and flame retardancy is poor.

Based on the results, it can be confirmed that the flame retardant resin composition according to the present invention comprises the polypropylene resin comprising the rubber ingredient in a proper content, and thus, other mechanical properties are also superior with superior extrudability, whereby the flame retardant resin composition is suitable for preparation of a variety of molded products, particularly electric wires including cables, requiring flame retardancy.

What is claimed is:

1. A flame retardant thermoplastic resin composition comprising:
   a matrix resin that comprises 20% to 40% by weight of a poly arylene ether resin, 20% to 40% by weight of a vinyl aromatic resin, and 5% to 17% by weight of a polypropylene resin comprising a rubber ingredient; and 10% to 30% by weight of a flame retardant, based on a total weight of the resin composition,
   wherein the vinyl aromatic resin is an SEBS-based block copolymer,
   wherein the polypropylene resin comprising the rubber ingredient comprises 1% to 20% by weight of the rubber ingredient based on the total weight of the polypropylene resin comprising the rubber ingredient, the rubber ingredient is at least one selected from the group consisting of ethylene-butene rubber, ethylene-propylene rubber and ethylene-propylene-diene (EPDM) rubber, and
   wherein the flame retardant comprises a metal phosphate.

2. The flame retardant thermoplastic resin composition according to claim 1, wherein the polypropylene resin comprising the rubber ingredient has a melt index of 10 to 50 g/10 min.

3. The flame retardant thermoplastic resin composition according to claim 1, wherein the flame retardant is selected from the group consisting of nitrogen-based flame retardants, phosphorus-based flame retardants and mixtures thereof.

4. The flame retardant thermoplastic resin composition according to claim 3, wherein the nitrogen-based flame retardant is comprised in an amount of 7% to 15% by weight based on a total weight of the resin composition.

5. The flame retardant thermoplastic resin composition according to claim 3, wherein the phosphorus-based flame retardant is comprised in an amount of 1% to 5% by weight based on a total weight of the resin composition.

6. An electric wire comprising the flame retardant thermoplastic resin composition according to claim 1.

7. An electric wire comprising the flame retardant thermoplastic resin composition according to claim 2.

8. An electric wire comprising the flame retardant thermoplastic resin composition according to claim 3.

9. An electric wire comprising the flame retardant thermoplastic resin composition according to claim 4.

10. An electric wire comprising the flame retardant thermoplastic resin composition according to claim 5.

11. The flame retardant thermoplastic resin composition according to claim 1, wherein the metal phosphate is an aluminum diethylphosphate.

12. The flame retardant thermoplastic resin composition according to claim 1, wherein the rubber ingredient comprises 5% to 15% by weight based on the total weight of the polypropylene resin comprising the rubber ingredient.

13. The flame retardant thermoplastic resin composition according to claim 1, wherein the rubber ingredient comprises 6% to 14% by weight based on the total weight of the polypropylene resin comprising the rubber ingredient.

14. The flame retardant thermoplastic resin composition according to claim 1, wherein the rubber ingredient comprises 6% to 9% by weight based on the total weight of the polypropylene resin comprising the rubber ingredient.

15. The flame retardant thermoplastic resin composition according to claim 1, wherein the rubber ingredient comprises ethylene-butene rubber.

16. The flame retardant thermoplastic resin composition according to claim 15, wherein a weight ratio of ethylene:butene is 1:9 to 9:1.

17. The flame retardant thermoplastic resin composition according to claim 1, wherein the polypropylene resin comprising the rubber ingredient is a copolymer of a propylene monomer and the rubber ingredient.

18. The flame retardant thermoplastic resin composition according to claim 1, wherein the rubber ingredient is contained within a main chain of the polypropylene resin.

19. The flame retardant thermoplastic resin composition according to claim 1, wherein the matrix resin comprises 10% to 16% by weight of the polypropylene resin comprising a rubber ingredient.

20. The flame retardant thermoplastic resin composition according to claim 1, wherein the matrix resin comprises 11% to 15% by weight of the polypropylene resin comprising a rubber ingredient.

* * * * *